Nov. 7, 1933.                H. H. BROOKS                1,933,655
                           GARDEN HOSE GUIDE
                           Filed July 31, 1933
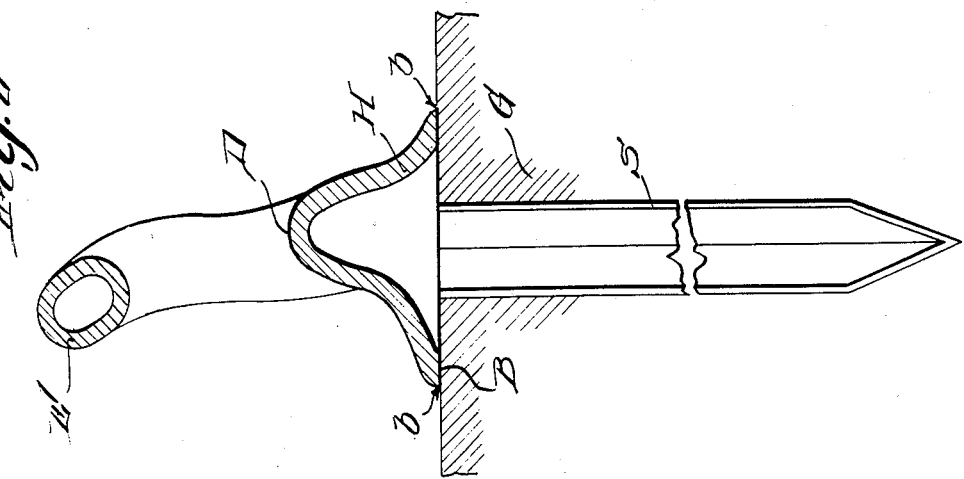
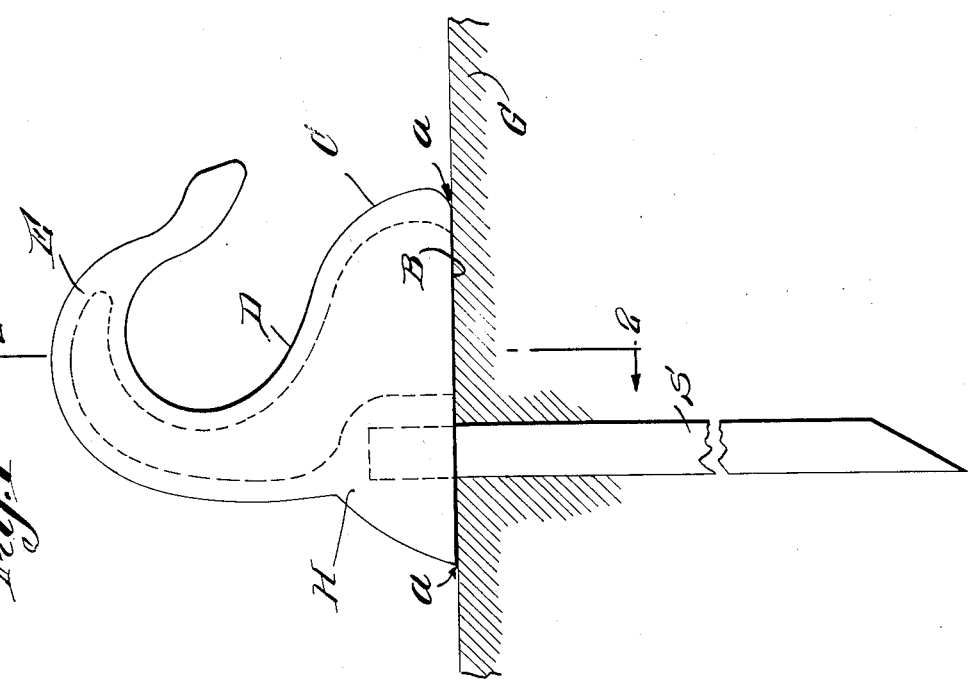
Inventor
Henry H. Brooks
By Roberts, Cushman & Woodbury
his Attorneys Patented Nov. 7, 1933

1,933,655

UNITED STATES PATENT OFFICE 1,933,655

GARDEN HOSE GUIDE

Henry H. Brooks, Concord, Mass.

Application July 31, 1933. Serial No. 682,957

3 Claims. (Cl. 254—190)

My invention consists in a guide for garden hose adapted to be fixed readily and firmly in the ground adjacent to plant beds, there to engage and guide a hose automatically without requiring attention on the part of the user, and to prevent such hose from being dragged into such beds to the injury of plants therein, adapted also to minimize the ground friction of the hose when it is drawn out to reach portions of a garden more or less remote from the water supply pipe to which the hose is attached.

In the drawing hereto annexed, which illustrates an embodiment of my invention,

Fig. 1 is a side elevation of the garden hose guide; and

Fig. 2 is a vertical section thereof along the line 2—2 of Fig. 1.

The guide, as illustrated in the drawing, is composed of two members, the hose guide member proper, marked H, and the securing stake therefor marked S. The guide member H is preferably constructed as a unitary casting of an inherently smooth textured metal, like typemetal, and I have found that other metal alloys, of which lead is a component, will equally well exemplify the inherently smooth material of which the guide member may be composed. By careful work in casting, iron would serve, but metal which resists corrosion is to be preferred. The stake member S is rigidly secured to the guide member, as by having the guide member metal cast around it in the mold. In order to secure the hose guide firmly against twisting in the ground, the stake S is preferably made of metal and is of such cross section as to present flat surfaces, large in proportion to the thickness of the metal, a piece of rolled angle-iron or steel will serve the purpose; the cross section may be an angle or L iron or a T iron, or any other cross section presenting substantially extended surfaces which will effectively resist stresses tending to turn the stake in the ground.

The guide member proper marked H is provided with a substantially extensive flat ground-engaging surface B, which when the stake member S is forced into the ground G, provides an ample bearing against the ground. The base portion of the guide slopes upwardly at C from the ground, this sloping surface leading to the hose-supporting surface at D. As indicated in Fig. 2, this hose-supporting surface is rounded, its curvature transversely of the guide having as large a radius as is practicable, so that it affords easy slippage of a hose drawn over it. The guide terminates in a hook portion E, which is curved over the hose-supporting surface D and serves to catch the hose if it should be jerked or drawn suddenly in such manner as to lift it from the surface D which normally supports it.

The above-described hose guide will, for example, be serviceable when secured in the ground at the corner of a garden bed, around which it is necessary to guide the hose in order to water plants situated beyond the corner. The guide being thus placed, the gardner draws the hose along the ground, simply walking around the hose guide on the side farthest from the bed. When he proceeds along the bed and away from the guide, the hose automatically tends to straighten out and would drag into and over the bed to the injury of the plants therein were it not for the intervention of the guide. The hose encounters the upwardly sloping surface C of the guide, and automatically slips up onto the supporting surface D. In so doing, the hose itself is lifted from the ground and ground-friction is by so much diminished. As the hose is drawn further it slips easily over the rounded surface at D, and any tendency of the hose to leave the restraint of the guide is checked by the overhanging hook portion thereof, while the flat-sided section of the stake S, supplemented by the firm ground seat of the guide portion, effectively resists any forces tending to twist, tip, or otherwise displace the guide from its original position.

Hose guides such as above described, when fixed in the ground at appropriate points in the garden, will automatically engage the hose and prevent its encroaching upon the garden beds themselves, the gardener having only to carry the nozzle end of the hose along the turf spaces or walks between the beds.

Dimensions for the hose guide which have been found satisfactory are: about six inches from $a$ to $a$ (Fig. 1); about four inches from $b$ to $b$ (Fig. 2); stake length about one foot.

I claim:

1. Garden hose guide, comprising a guide member and a stake of flat-sided cross section rigidly secured to the guide member, the guide member having a substantially extensive ground-engaging surface surrounding the stake on all sides thereof, a base portion sloping upward from the ground-engaging surface, a rounded hose-supporting surface adapted to afford easy slippage of a garden hose thereover, to which the said upward sloping surface leads, and a hook portion overhanging the hose-supporting surface.

2. Garden hose guide, comprising a guide member and a stake rigidly secured to the guide member, the guide member composed of inherently smooth metal, as exemplified by a lead-containing alloy and having a substantially extensive and flat ground-engaging surface, a base portion sloping upward from the ground-engaging surface, a rounded hose-supporting surface adapted to afford easy slippage of a garden hose thereover, to which the said upward sloping surface leads, and a hook portion overhanging the hose-supporting surface.

3. Garden hose guide, comprising a guide member and a stake of flat-sided cross section rigidly secured to the guide member, the guide member composed of inherently smooth metal, as exemplified by a lead-containing alloy and having a substantially extensive and flat ground-engaging surface, a base portion sloping upward from the ground-engaging surface, a rounded hose-supporting surface adapted to afford easy slippage of a garden hose thereover, to which the said upward sloping surface leads, and a hook portion overhanging the hose-supporting surface.

HENRY H. BROOKS.